(12) United States Patent
Davis et al.

(10) Patent No.: US 12,424,728 B2
(45) Date of Patent: Sep. 23, 2025

(54) RFID ANTENNA

(71) Applicant: Attache Holdings LLC, Montgomery, TX (US)

(72) Inventors: Alan Wesley Davis, Houston, TX (US); John Francis Mahony, Montgomery, TX (US)

(73) Assignee: Attache Holdings LLC, Montgomery, TX (US)

( * ) Notice: Subject to any disclaimer, the term of this patent is extended or adjusted under 35 U.S.C. 154(b) by 0 days.

(21) Appl. No.: 18/919,154

(22) Filed: Oct. 17, 2024

(65) Prior Publication Data

US 2025/0038395 A1    Jan. 30, 2025

Related U.S. Application Data

(63) Continuation-in-part of application No. PCT/US2023/019134, filed on Apr. 19, 2023.

(60) Provisional application No. 63/332,886, filed on Apr. 20, 2022.

(51) Int. Cl.
*H01Q 1/22* (2006.01)
*H01Q 15/14* (2006.01)

(52) U.S. Cl.
CPC ........... *H01Q 1/2225* (2013.01); *H01Q 15/14* (2013.01)

(58) Field of Classification Search
CPC ........ H01Q 1/088; H01Q 15/165; H01Q 1/40; H01Q 1/405; H01Q 21/28; H01Q 15/14

See application file for complete search history.

(56) References Cited

U.S. PATENT DOCUMENTS

| | | | |
|---|---|---|---|
| 2,726,389 A | 12/1955 | Taylor | |
| 5,512,913 A | 4/1996 | Staney | |
| 6,320,509 B1 | 11/2001 | Brady et al. | |
| 7,221,276 B2 | 5/2007 | Olsen et al. | |
| 2004/0217908 A1* | 11/2004 | Zigler | H01Q 1/12 |
| | | | 343/757 |

(Continued)

FOREIGN PATENT DOCUMENTS

| CN | 211350972 U | 8/2020 |
|---|---|---|
| CN | 112436270 A | 3/2021 |

(Continued)

OTHER PUBLICATIONS

Bauk et al. "An RFID Model For Improving Workers' Safety At The Seaport In Transitional 1-20 Environment," Transport, doi: 10.3846/16484142.2016.1233512, Dec. 2, 2016. Retrieved on Jun. 6, 2023, retrieved from the internet: <https://www.proquest.com/openview/99c9d8addcdc1c7a3cdcf8354d21f5cf/12cbl=1416345&pq-origsite=gscholar&parentSession Id=yitlYS3cTiG96 MNqtHupbAX%2FeZpcoS6X%2B0mcc%2B2CjvY%3D>.

*Primary Examiner* — Mirza F Alam

(57) ABSTRACT

The present invention provides an improved RFID Antenna. The improved RFID antenna comprises an antenna grid panel; a plurality of antennas having a square shape structure with a ceramic material attached in front of the square shape structure; a plurality of reflectors positioned behind each of the antennas; a base positioned behind the plurality of reflectors, the base is attached to the antenna grid panel; a plurality of antenna shafts; and the plurality of reflectors connected to the each of the antennas by an antenna shaft which extends from the base through the center of each reflector.

20 Claims, 7 Drawing Sheets

(56) References Cited

U.S. PATENT DOCUMENTS

| | | | |
|---|---|---|---|
| 2010/0035370 A1* | 2/2010 | Ding | H01Q 1/40 257/E21.001 |
| 2016/0156107 A1* | 6/2016 | Lee | H01Q 1/1207 29/601 |
| 2016/0172765 A1* | 6/2016 | Motta-Cruz | H01Q 1/1271 343/834 |
| 2017/0243457 A1 | 8/2017 | Milbrand | |
| 2019/0252785 A1 | 8/2019 | Mcmichael | |
| 2021/0089729 A1 | 3/2021 | Srinivasan | |
| 2021/0343182 A1 | 11/2021 | Lu | |
| 2023/0178895 A1* | 6/2023 | Johnson | H01Q 1/08 343/725 |

FOREIGN PATENT DOCUMENTS

| | | |
|---|---|---|
| EP | 2362332 A1 | 8/2011 |
| WO | 2015113446 A1 | 8/2015 |
| WO | 2022049102 A1 | 3/2022 |

* cited by examiner

RFID ANTENNA

FIELD OF THE INVENTION

The present invention relates to the field of antenna technology. More particularly, the present invention relates to an RFID (radio frequency identification) antenna with improved communication range.

BACKGROUND OF THE INVENTION

An RFID antenna with improved communication range is in demand. Radio Frequency Identification (RFID) antennas are used to read RFID tags in various environments including warehouses, production lines, stores, medical and personal systems, etc.

However, users of RFID antenna often encounter communication range problems. In addition, UHF systems can suffer interference due to reflection or re-radiation of power signals. Thus, it is essential that users need to make careful site planning and antenna or reader tuning. Passive or semi-passive systems create less risk of interference than active ones. Therefore, there is a need to improve RFID antennas to overcome these problems.

The present invention is intended to address problems associated with and/or otherwise improve on conventional devices through an innovative antenna designed to provide a convenient, effective means to ensure extended RFID antenna range while incorporating other problem-solving features.

SUMMARY OF THE INVENTION

An improved RFID antenna is disclosed. The improved RFID antenna comprises an antenna grid panel, a plurality of antennas having a square shape structure with a ceramic material attached to the front of the square shape structure, a plurality of reflectors positioned behind each of the antennas, a base positioned behind the plurality of reflectors, the base is attached to the antenna grid panel, a plurality of antenna shafts, and the plurality of reflectors connected to the each of the antennas by an antenna shaft which extends from the base through the center of each reflector.

In one embodiment, the plurality of reflectors includes a circular shape and the antenna is mounted on the reflector via a plurality of antenna mounts located at each corner of the antenna.

In some embodiments, the reflectors are made from a steel, brass, bronze, copper, or other metal material. Each reflector may include a lessor amount of steel, copper, brass or bronze than the one behind it.

DETAIL DESCRIPTIONS OF THE INVENTION

All illustrations of the drawings are for the purpose of describing selected versions of the present invention and are not intended to limit the scope of the present invention.

The present invention provides a new type of passive RFID antenna. In one embodiment, the present invention can be used to read the passive UHF RFID tags attached to clothing, machines, vehicles, equipment and other gear at long ranges. The Tags are read by UHF RFID antennas and readers.

The read range as defined by the RFID industry is the range at which a tag can be read by an antenna. The standard reading range today for Passive UHF RFID antennas is from 3-10 meters. Specialty antennas and readers, referred to by the industry as "long range", can achieve read distances from 10-20 meters with some able to pick up intermittent signals from tags as far as 25-30 meters. For the purposes of the invention these distances were inadequate and very limiting. Because of these limitations new technology would need to be invented that could read Passive UHF RFID tags at a much greater distance and with much more consistency.

The invention contains newly invented antennas designed to read Passive UHF RFID tags at very long distances. This newly developed antenna can communicate with built-in redundancy far past distances previously thought impossible for passive RFID.

In some embodiments, the present invention may include one or more Long Range UHF RFID Antennas in order to read the invention's Passive UHF RFID Tags at greater distances than the RFID industry's current standards.

It should be understood that the present invention may include one or more of the components of the invention, including, but not limited to, an antenna grid panel, antennas, reflectors, and antenna shafts.

The Long Range UHF RFID Antennas is designed with multiple layers of metal discs and a base shield behind a ceramic, metal or other material UHF RFID antenna. The metal discs are made from copper and are circular but may also be configured in other metals and shapes. The invention may also use the addition of small metal posts attached to the outer area of second metal disc. These metal posts are made from brass but may be made from other material and can vary in length.

Figure 1:
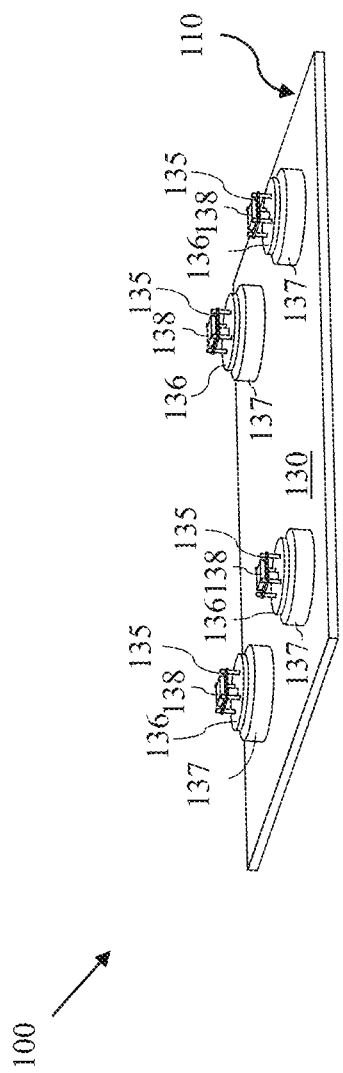
FIG. 1 is a perspective view of the quad antenna grid of the present invention.
Figure 2:
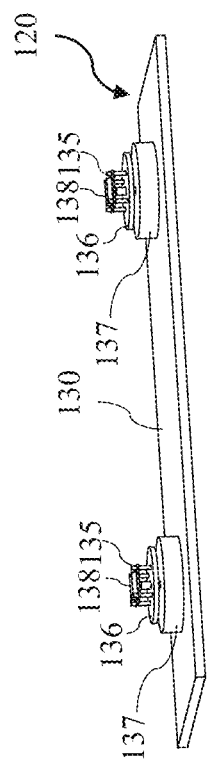
FIG. 2 is a perspective view of the dual antenna grid of the present invention.

As shown in FIG. 1 and FIG. 2, the present invention provides an improved antenna comprising an antenna grid 100.

The antenna grid 100 is designed in a grid pattern with a dual 120 and quad antenna grid 110 types. In its preferred embodiment the antenna grid 100 comprises a grid panel 130, a plurality of antennas 135, a plurality of reflectors 136, and a base 137. The plurality of antennas 135 is designed with a square shape structure with a ceramic material on the front of the antenna 135.

Figure 3:
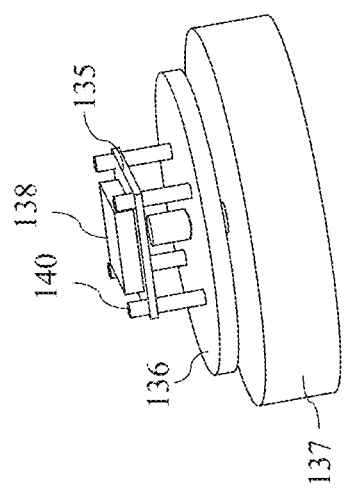
FIG. 3 is an illustration of one embodiment of the grid panel, antenna, reflector, and base of the present invention.
Figure 4:
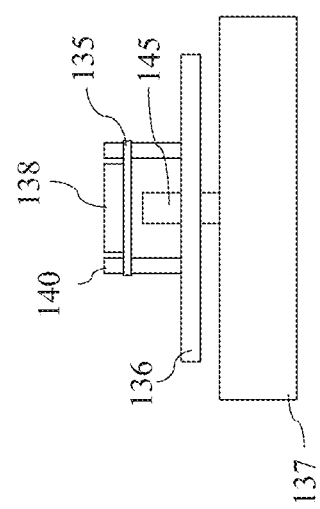
FIG. 4 is a side view of the grid panel, antenna, reflector, and base of the present invention.
Figure 5:
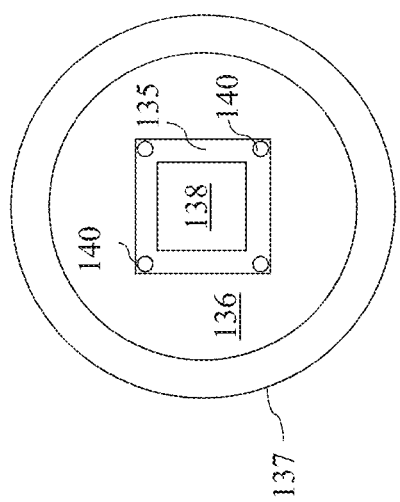
FIG. 5 is a top view of the grid panel, antenna, reflector, and base of the present invention.

As shown in FIGS. 3-5, the plurality of antenna 135 is mounted to the antenna grid panel 130 via a plurality of antenna mounts 140 located at each corner of the plurality of antenna 135. In one embodiment, the antenna 135 can be mounted on the reflector 136 via a plurality of antenna mounts 140 located at each corner of the antenna 135. The antenna mounts 140 can be elongated shafts or rods.

Positioned behind the plurality of antenna 135 is the plurality of reflectors 136 with a circular shape made of preferably a steel, brass, bronze, copper, or other metal material. Each reflector 136 has a lessor amount of steel, copper, brass or bronze than the one behind it.

The plurality of reflectors 136 direct radio frequency (RF) signals on the front side of the antenna 135 and block RF signals on the back side of the plurality of antenna grids 100. This design ensures that hazardous work zones can be indicated by both blocking and directing signals.

Further, the base 137 is positioned behind the plurality of antenna 135 and the plurality of reflectors 136 to secure the present invention and ensure it can be mounted in various places.

The plurality of reflectors 136 can be supported by an antenna shaft 145 which can be extending from the base 137 through the center of each reflector 136. In some embodiments, the present invention may include a plurality of antenna shafts 145 and the rectangular antenna 135 can be placed on a reflector 136 and supported by a plurality of support members (antenna mounts 140).

In some embodiments, the reflector 136 can be configured to rotate around the antenna shaft 145 and the antenna shaft 145 can be configured to move outward from the base 137 so that the height (distance from the base 137) of the reflector 136 can be adjusted.

Figure 6:
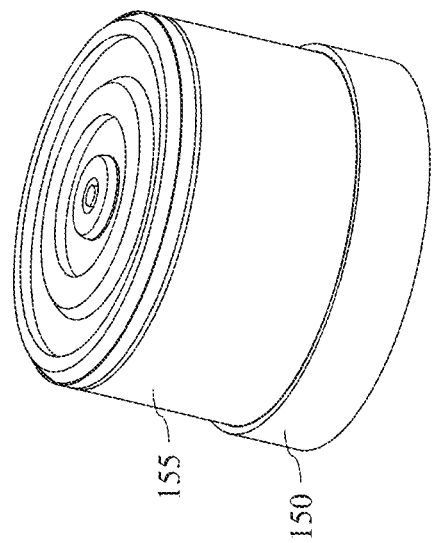
FIG. 6 is an illustration of one embodiment of the collar and shield of the present invention.
Figure 7:
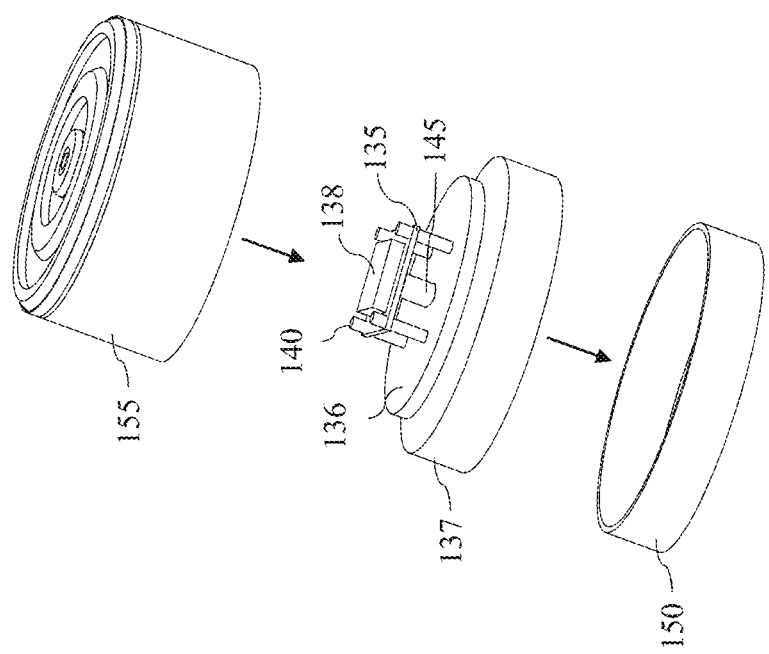
FIG. 7 is an exploded view showing the collar and shield of the present invention.

In alternative embodiments, as shown in FIGS. 6-7, the plurality of antenna grids 100 can comprise collars 150 and shields 155. The collars are designed to narrow or expand the field of focus depending on the required range the signals the plurality of antenna 135 needs to send and receive. The shield 155 covers the antenna 135 to prevent unnecessary damage.

In some embodiments, the dual 120 and quad 110 antenna grids layouts connect to RF radios that can be connected behind the plurality of antenna grids 100. The radios and interface boards can further be housed within IP65, IP66, IP67 and EX/ATEX/IECEx rated housing to prevent damage to the components due to environmental effects. It should be further noted that, the plurality of antenna grids 100 can be created in various shapes and sizes and the plurality of antenna 135 can alternate in size while still staying within the scope of the present invention.

Although the invention has been explained in relation to its preferred embodiment, it is to be understood that many other possible modifications and variations can be made without departing from the spirit and scope of the invention.

What is claimed is:

1. A device comprising:
an antenna grid panel;
one or more antennas having a square shape structure with a ceramic plate attached on the front of the square shape structure;
one or more reflectors positioned behind each of the antennas;
a base positioned behind the one or more reflectors, the base is attached to the antenna grid panel;
one or more antenna shafts; and
the one or more reflectors connected to the each of the antennas by the one or more antenna shafts which extend from the base through the center of each reflector.

2. The device of claim 1, wherein the one or more reflectors includes a circular shape.

3. The device of claim 1, wherein the antenna grid panel includes a rectangular shape.

4. The device of claim 1, wherein the antenna is mounted on the reflector via one or more antenna mounts located at each corner of the antenna.

5. The device of claim 1, wherein the each reflector includes copper material and each reflector includes less amount of copper material than the one behind the each reflector.

6. The device of claim 1, wherein the each reflector includes bronze material and each reflector includes less amount of bronze material than the one behind the each reflector.

7. The device of claim 1, wherein the each reflector includes steel material and each reflector includes less amount of steel material than the one behind the each reflector.

8. A device comprising:
an antenna grid panel;
two antennas having a square shape structure with a ceramic plate attached in front of the square shape structure;
one or more reflectors positioned behind each of the antennas;
a base positioned behind the one or more reflectors, the base is attached to the antenna grid panel;
one or more antenna shaft;
the one or more reflectors connected to the each of the antennas by the one or more antenna shafts which extends from the base through the center of each reflector, and the reflector is configured to rotate around the antenna shaft.

9. The device of claim 8, wherein the one or more reflectors includes a circular shape.

10. The device of claim 8, wherein the antenna grid panel includes a rectangular shape.

11. The device of claim 8, wherein the antenna is mounted on the reflector via one or more antenna mounts located at each corner of the antenna.

12. The device of claim 8, wherein the each reflector includes copper material and each reflector includes less amount of copper material than the one behind the each reflector.

13. The device of claim 8, wherein the each reflector includes bronze material and each reflector includes less amount of bronze material than the one behind the each reflector.

14. The device of claim 8, wherein the each reflector includes steel material and each reflector includes less amount of steel material than the one behind the each reflector.

15. A device comprising:
an antenna grid panel having one or more collars attached to the antenna grid panel and one or more shields attached to the collars;
four antennas having a square shape structure with a ceramic plate attached in front of the square shape structure;
one or more reflectors positioned behind each of the antennas, the base is attached to the antenna grid panel;
a base positioned behind the one or more reflectors, wherein the base and the one or more reflectors include a circular shape;
one or more antenna shafts;
the one or more reflectors connected to the each of the antennas by the one or more antenna shafts which extends from the base through the center of each reflector, the reflector is configured to rotate around the antenna shaft, and the antenna shaft is configured to move outward from the base.

16. The device of claim 15, wherein the antenna grid panel includes a rectangular shape.

17. The device of claim 15, wherein the antenna is mounted on the reflector via one or more antenna mounts located at each corner of the antenna.

18. The device of claim 15, wherein the each reflector includes copper material and each reflector includes less amount of copper material than the one behind the each reflector.

19. The device of claim 15, wherein the each reflector includes bronze material and each reflector includes less amount of bronze material than the one behind the each reflector.

20. The device of claim 15, wherein the each reflector includes steel material and each reflector includes less amount of steel material than the one behind the each reflector.

* * * * *